United States Patent

[11] 3,569,744

[72] Inventor Norman M. Garrahan
Silver Spring, Md.
[21] Appl. No. 756,511
[22] Filed Aug. 30, 1968
[45] Patented Mar. 9, 1971
[73] Assignee The United States of America as represented by the Administrator of the National Aeronautics and Space Administration

[54] RESETTABLE MONOSTABLE PULSE GENERATOR
12 Claims, 4 Drawing Figs.

[52] U.S. Cl. .......... 307/273, 307/234, 307/246, 328/120, 330/30
[51] Int. Cl. .......... H03k 3/284
[50] Field of Search .......... 307/207, 234, 246, 273; 328/120; 330/30 (D)

[56] References Cited

UNITED STATES PATENTS

| | | | |
|---|---|---|---|
| 2,719,226 | 9/1955 | Gordon et al. | 328/120X |
| 3,068,367 | 12/1962 | Brown et al. | 328/120X |
| 3,290,518 | 12/1966 | Guisinger | 307/234 |
| 3,297,884 | 1/1967 | Baldwin et al. | 307/246X |

*Primary Examiner* – Donald D. Farrer
*Assistant Examiner* – R. C. Woodbridge

ABSTRACT: This disclosure describes a resettable monostable pulse generator including a charge rundown-timing circuit. The charge rundown-timing circuit includes a capacitor that is charged to a peak value by a random pulse from a constant amplitude pulse source. After being charged, the capacitor immediately starts to discharge toward zero. In addition, an output pulse generator starts to generate an output pulse as soon as the capacitor is charged to its peak value and continues to generate the output pulse until the charge drops to a predetermined level. If a second pulse from the constant amplitude pulse source occurs during this rundown period, the capacitor is again charged to its peak value. This "reset" pulse prevents termination of the output pulse and recycles the termination time of the output pulse (pulse width) to be measured from the inception of the last reset pulse. Each time a "reset" pulse occurs during a rundown period, the capacitor is recharged to its peak value; hence, the output pulse can exist for a short or long period of time depending on the occurrence of random reset pulses.

The invention described herein was made by an employee of the United States Government and may be manufactured and used by or for the Government for governmental purposes without the payment of any royalties thereon or therefor.

PATENTED MAR 9 1971
3,569,744
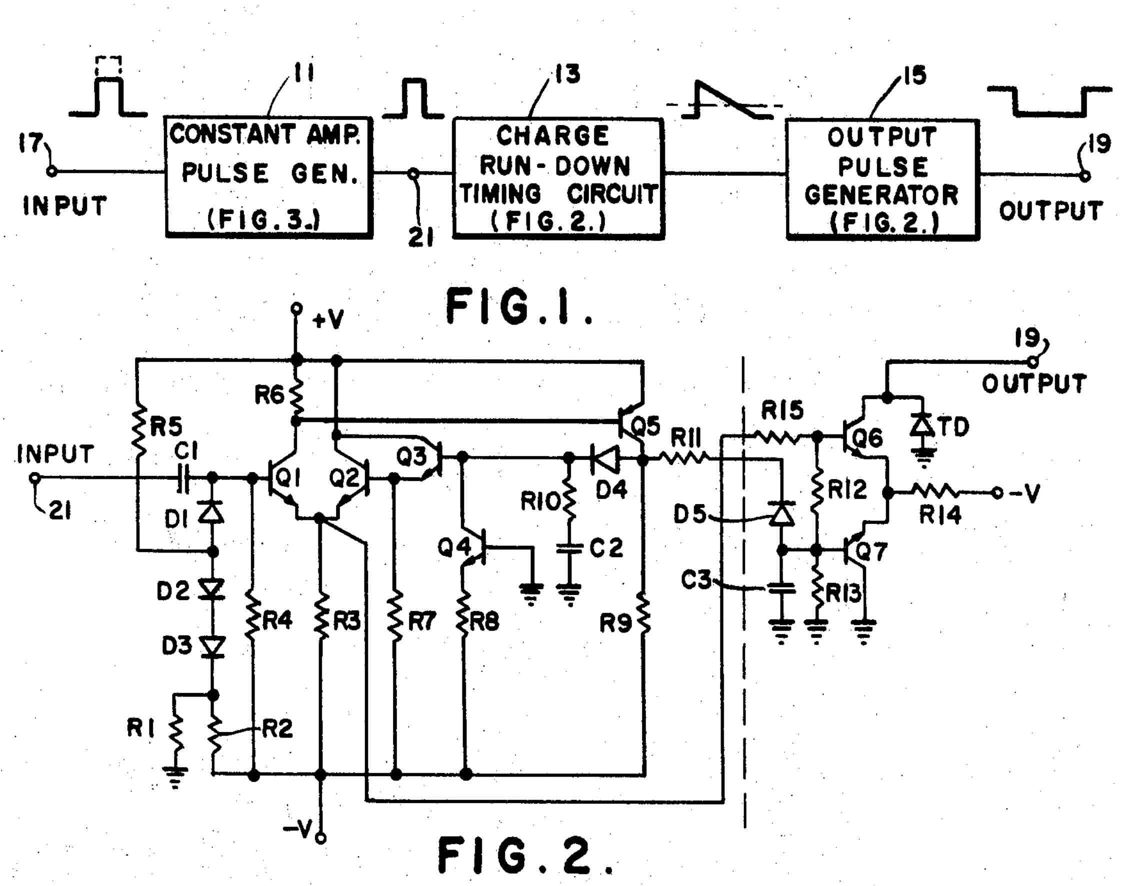
FIG. 1. FIG. 2.
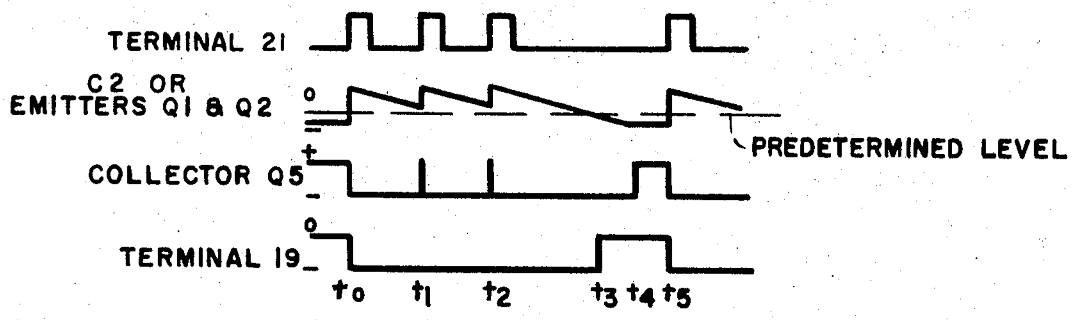
FIG. 3.
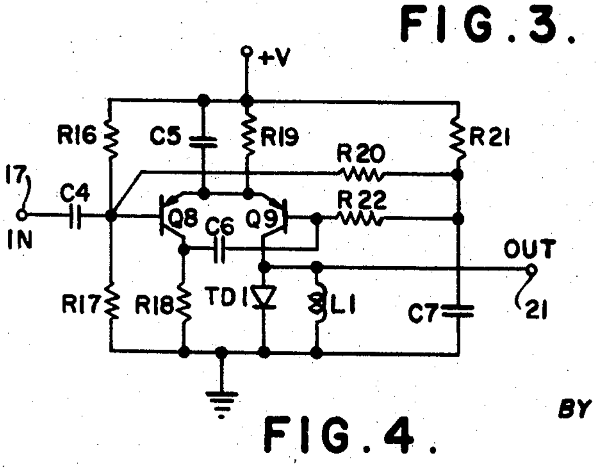
INVENTOR
Norman M. Garrahan
BY
ATTORNEYS

08301968

RESETTABLE MONOSTABLE PULSE GENERATOR

Many electronic circuits require resettable monostable multivibrators; that is many electronic circuits require monostable multivibrators that continue to generate an output pulse as long as input pulses are applied within predetermined time periods. In the past, this function has been performed by a bistable multivibrator in combination with AND and OR gating circuits. While these circuits have been used, their use has been limited because only a limited number of closely spaced repetitive trigger pulses can be accepted by these circuits. If more than this limited number of pulses are accepted within an output pulse duration time, amplitude interruption of a particular bistable output state occurs. Because of their pulse limitations, these circuits are more complex than desirable. That is, each additional pulse that arrives within the ontime duration of the driving bistable multivibrator requires an additional series of AND, OR and bistable multivibrators appropriately connected to insure that there is no undesired interruption of the state of the driving bistable multivibrator. In addition, because an excessive number of circuits are required, excessive power is required. Hence, the prior art circuits generally have three disadvantages: (1) they are pulse limited; (2) they are complex and, therefore, expensive; and (3) their power drain is excessive.

Therefore, it is an object of this invention to provide a new and improved resettable monopulse generator.

It is also an object of this invention to provide a resettable monopulse generator that does not require the use of bistable multivibrators, AND gates and OR gates.

It is a further object of this invention to provide a resettable monostable pulse generator that is not frequency limited.

It is a still further object of this invention to provide a new and improved resettable monopulse generator that is not limited in the number of input pulses that it can receive during an output pulse duration time, is electronically uncomplex, and is not excessive in its power requirement.

SUMMARY OF THE INVENTION

In accordance with a principle of this invention, a novel resettable monostable pulse generator including a charge rundown circuit is provided. The charge rundown circuit includes a capacitor that is charged to a peak value each time a random pulse from a pulse source is applied to the circuit. Immediately after receiving a peak charge, the capacitor starts to linearly discharge toward zero. In addition, immediately upon the capacitor receiving a peak charge, an output pulse generator circuit starts to generate an output pulse. The output pulse continues to be generated until the voltage level of the discharging capacitor reaches a predetermined value. When this value is reached, the output pulse is terminated. However, if a second random pulse is applied to the charge rundown circuit during the period from the start of the output pulse until the voltage level of the capacitor reaches the predetermined value, the capacitor is recharged to its peak voltage value; hence, the output pulse is not terminated. Upon being recharged to its peak voltage level, the capacitor again starts to discharge toward zero. If it reaches the predetermined low value before further random resetting pulse is received by the rundown circuit, the output pulse is terminated. However, if it receives a second resetting pulse during the rundown period, the capacitor is again recharged to its peak voltage level and again starts to run down. Hence, the output pulse continues to exist until no further resetting pulses are received during the rundown period from the peak value to the predetermined voltage level. The output pulse width is preset by a proper selection of the timing capacitor and its associated discharge network. Each newly received input pulse recycles the output pulse termination time to achieve the preset width without amplitude interruption to the existing output state, providing the newly arrived input pulses occur within the preset output pulse width.

It will be appreciated by those skilled in the art and others that the invention provides an uncomplicated and, therefore, inexpensive resettable monostable pulse generator. The circuit does away with the plurality of bistable multivibrators in combination with the plurality of AND and OR gates required by prior art monostable pulse generators. This elimination results in a less complex circuit and, therefore, a less expensive circuit. In addition, the inventive circuit is not input pulse limited as are prior art circuits. The invention accepts input pulses at random frequency and, each time an input pulse occurs, the timing capacitor is recharged for a new output pulse termination time. Hence, input pulses can occur at any frequency rate without "overloading" the circuit.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a block diagram illustrating the overall concept of the invention;

FIG. 2 is a schematic diagram illustrating a rundown-timing circuit and an output pulse generator suitable for use in the block diagram illustrated in FIG. 1;

FIG. 3 is a timing diagram utilized to describe the operation of the circuit illustrated in FIG. 2; and FIG. 4 is a schematic diagram of a circuit suitable for generating constant amplitude pulses from an unconstant amplitude pulse source.

DESCRIPTION OF THE PREFERRED EMBODIMENT

FIG. 1 is a block diagram illustrating the basic concept of the invention and comprises: a constant amplitude pulse generator 11; a charge rundown-timing circuit 13; and an output pulse generator 15. The input of the constant amplitude pulse generator 11 is connected to an input terminal 17 which is adapted to receive random pulses which may or may not be of constant amplitude. The constant amplitude generator generates pulses at the same repetition rate as the repetition rate for the input pulses, but, at a constant amplitude.

The output pulses from the constant amplitude pulse generator 11 are connected to the input of the charge rundown-timing circuit 13. The constant amplitude pulses charge a capacitor contained in the charge rundown-timing circuit 13 to peak value. The charge on the capacitor starts to run down to zero immediately after it has been charged to its peak value. The declining charge signal is applied to the output pulse generator 15.

When the capacitor is charged to its peak value, the output pulse generator 15 starts to generate an output pulse. This output pulse continues to be generated as long as the declining charge signal from the charge rundown-timing circuit 13 is above a predetermined level. The declining charge signal remains above the predetermined level as long as new pulses are applied to the charge rundown-timing circuit during the period of time it takes for the voltage charge on the capacitor to run down from its peak level to the predetermined level. That is, if a reset (new) pulse is applied to the charge rundown circuit during the rundown interval, the capacitor is a recharged to its peak value and the output pulse termination time is again extended for the preset value. Because it is recharged to its peak value, it continues to apply a declining charge signal to the output pulse generator 15 that is above the predetermined voltage level. This signal maintains the output pulse generator in its output pulse-generating state. When the charge on the capacitor drops below the predetermined level because a reset pulse does not occur during the preset rundown period, the output pulse generator terminates the output pulse.

It will be appreciated from the foregoing description that the invention provides a novel monostaBle pulse generator.

The generator is uncomplicated because it merely requires charging and recharging a capacitor to a peak value. As long as the capacitor is recharged to its peak value during a predetermined rundown period, an output pulse is generated. However, when the charge on the capacitor drops below the predetermined value, the output pulse is terminated. Hence, each new pulse provides a newly extended output pulse termination time regardless of how much charge remains on the timing capacitor when the new pulse arrives; the output pulse termination time being measured from the inception of the last received pulse.

It will be appreciated by those skilled in the art and others that the constant amplitude pulse generator 11 may or may not be included in the invention. Specifically, many electronic circuits and systems inherently generate constant amplitude pulses. Hence, if the invention is used with such circuits or systems, the constant amplitude pulse generator is not necessary and can be eliminated. Conversely, if the input pulses are not of constant amplitude, then the constant amplitude pulse generator must be included.

FIG. 2 is a schematic diagram of a transistorized circuit suitable for carrying out the charge rundown-timing circuit function and the output pulse generator function of the invention. The portion of the schematic diagram on the left of the vertical dashed line comprises the charge rundown-timing circuit while the portion of the schematic diagram on the right of the vertical dashed line comprises the output pulse generator.

The charge rundown-timing circuit portion of the schematic diagram of FIG. 2 comprises: four NPN transistors designated Q1, Q2, Q3 and Q4; a PNP transistor designated Q5; four diodes designated D1, D2, D3 and D4; two capacitors designated C1 and C2; and eleven resistors designated R1 through R11.

An input pulse terminal 21 is connected through C1 to the base of Q1 and the cathode of D1. The anode of D1 is connected to the anode of D2 and the cathode of D2 is connected to the anode of D3. The cathode of D3 is connected through R1 to ground. The junction between D3 and R1 is connected through R2 in series with R3 to the emitter of Q1. R4 is connected in parallel with D1, D2, D3 and R2. The junction between R2 and R3 is connected to a negative voltage source designated –V. The junction between D1 and D2 is connected through R5 to a positive voltage source designated +V. The collector of Q1 is connected through R6 to +V.

The emitter of Q2 is connected to the emitter of Q1 and the collector of Q2 is connected to +V and to the collector of Q3. The base of Q2 is connected to the emitter of Q3 and through R7 to –V. The base of Q3 is connected through the collector-emitter junction of Q4 in series with R8 to –V. The base of Q4 is connected to ground. The collector of Q1 is connected to the base of Q5 and the emitter of Q5 is connected to +V. The collector of Q5 is connected to the anode of D4 and through R9 to –V. The cathode of D4 is connected to the collector of Q4 and through R10 in series with C2 to ground. The collector of Q5 is also connected to one end of R11.

The output pulse generator portion of the schematic diagram illustrated in FIG. 2 comprises: two NPN transistors designated Q6 and Q7; a diode designated D5; a tunnel diode designated TD; a capacitor designated C3; and four resistors designated R12, R13, R14 and R15. The other end of R11 is connected to the cathode of D5. The anode of D5 is connected to the base of Q7 and through C3 in parallel with R13 to ground. The emitters of Q1 and Q2 are connected through R15 to the base of Q6 and through R12 and R15 to the base of Q7. The collector of Q7 is connected to ground.

The emitters of Q6 and Q7 are connected together and through R14 to –V. The collector of Q6 is connected to the cathode of TD and the anode of TD is connected to ground. The junction between the collector of Q6 and the cathode of TD is connected to the output terminal 19.

In general, the circuit illustrated in FIG. 2 operates so that the output at terminal 19 has a high state and a low state. The output shifts from a high state to a low state when a pulse occurs. The output remains in the low state until the charge on C2 reduces to a predetermined voltage level. When this occurs, the output pulse terminates. However, if a second pulse is applied to the input terminal 21 prior to the charge on C2 reaching the predetermined voltage level, the charge is reset to its peak value and the pulse does not terminate. By controlling the value of C2 and its discharge circuit (Q4) the output time duration from a particular input is controllable (i.e., presettable).

Turning now to a more specific description of the operation of the circuit illustrated in FIG. 2; on receipt of a constant amplitude input pulse C2 is charged to a fixed or peak level and immediately commences to discharge linearly towards a zero charge level through Q4. The discharging signal is sensed by the cascaded emitter follower consisting of transistors Q2 and Q3. Preferably, the cascaded emitter follower offsets the discharge voltage signal by a predetermined amount, such as –0.5 volts, for example.

The voltage at the emitter of Q2 is applied to the output pulse generator circuit 15. The output pulse generator circuit senses the Q2 emitter signal and is actuated when the voltage level of that signal is above a predetermined value such as –0.3 volts above ground, for example.

When the charge rundown-timing circuit receives a second or subsequent input pulse within the RC rundown time duration (time of discharge form C2's peak level to the predetermined level), the acquired charge on C2 is reset to the fixed peak level and the first or previous rundown is terminated. A new rundown commences from the new level of acquired charge and proceeds toward the zero level. Hence, the old C2 charge does not fall to a zero level; rather, the C2 charge is reset to the peak level by the new input pulse. FIG. 3 is a timing diagram that illustrates the foregoing operation.

The first line of FIG. 3 illustrates the occurrence of input pulses at terminal 21. For purposes of description three pulses ($t_0$, $t_1$ and $t_2$) that occur within the RC rundown time duration are illustrated on the left of the first line of FIG. 3 and pulse that occurs ($t_5$) outside of the rundown time duration is illustrated on the right side of the first line of FIG. 3. The second line of FIG. 3 illustrates the voltage on C2 or at the emitters of Q1 and Q2 (ignoring any time delay). When the first pulse occurs ($t_O$) the voltage of the emitters of Q1 and Q2 climbs to a peak level and starts to run down. Because the second pulse occurs ($t_1$) before the voltage at the emitters of Q1 and Q2 drops to the predetermined level, as indicated by the horizontal dashed line cutting line 2 of FIG. 3, the voltage at the emitters of Q1 and Q2 climbs back to its peak value without the pulse at terminal 19 (line 4) changing state. A similar situation occurs when the third pulse occurs ($t_2$), i.e., the voltage at the emitters of Q1 and Q2 climbs to its peak level and starts to run down. Hence, the output pulse stays in the low state. Because the fourth pulse does not occur ($t_5$) during the RC rundown time duration, the declining voltage passes through the dashed line and reaches the zero level. When the declining voltage passes through the dashed line ($t_3$), the output raises from the low state to the high state. This period, the third pulse inception time ($t_2$) to termination time, ($t_3$), is the preset output pulse width, and will only appear as a discrete (preset) time duration when the input pulse spacing falls outside of the RC rundown time duration; otherwise, the negative output pulse state will continue to be extended indefinitely in steps of the preset time duration for each input pulse. Thereafter, when the fourth pulse occurs ($t_5$), the output drops from the high state to the low state for another preset time duration if, uninterrupted by a closely following pulse.

The third line of FIG. 3 illustrates the voltage at the collector of Q5. Prior to the occurrence of the first input pulse at $t_0$, the collector voltage of Q5 is at a high level because Q5 is biased off. When the first input pulse is applied to terminal 21, Q5 is triggered on and its collector voltage drops to a low or negative value. Thereafter, each subsequent pulse that occurs within the rundown time duration creates a fast pulse at the collector of Q5 which immediately drops back to the low or negative value. However, if a pulse does not occur within the charge rundown time duration of C2 and Q4, Q5 is biased off and its collector voltage goes to a positive value as illustrated between $t_4$ and ($t_5$) on the third line of FIG. 3.

As discussed above, the fourth line of FIG. 3 merely indicates the state of the output signal at terminal 19. Upon the occurrence of the initial pulse at terminal 21 the output voltage drops from a high value to a low value. The output voltage remains at this low value until an input pulse fails to occur during the rundown period, i.e., at time $t_3$. At time $t_3$, the voltage at the emitters of Q1 and Q2 passes through the dashed line and the output voltage returns to the high level. It remains at the high level until the fourth pulse occurs which causes it to drop back to the low level. The output voltage remains at the low level until the charge rundown again passes through the dashed line.

It will be appreciated by those skilled in the art that transistors Q1 and Q2 form an emitter-coupled pair and function as a voltage comparator of the voltages applied to their respective bases. The output voltage is a signal taken across R6 and used to drive Q5 which charges the timing capacitor C2 through a fast recovery diode D4. The three input diodes D1, D2, and D3 form a DC restorer (and temperature compensating) circuit which references all incoming pulses to a common level. Transistor Q4 and resistor R8 provide a constant current discharge path for C2 so that a linear rundown is achieved. Transistor Q3 provides a high impedance couple between the voltage comparator function provided by Q1 and Q2 and the timing capacitor C2. It should be noted that where stringent requirements on pulse width variations prevail, R8 may be connected to a Zener diode control reference voltage instead of directly connected to the power bus as illustrated in FIG. 2.

A more specific description of the operation of the invention is hereinafter described. Disregarding circuit components R11 and D5 for the moment, on receipt of an input pulse, Q1 drives Q5 which rapidly forces a charge into C2 through D4. The width of the input pulse is chosen to permit C2 to charge to the peak input amplitude while the input pulse is still present on the base of Q1. Thus, an input-image pulse appears on the base of Q2. Voltage comparator Q1 and Q2 now cause the collector of Q1 to seek null, thus removing the drive from across R6. By this time, the input pulse has passed and C2 commences to discharge through Q4. The termination of the drive on Q5 results in its collector rising to the supply voltage −V; therefore, diode D4 is back biased prevent any leak back of the charge on C2. The discharge path of C2 is mainly through Q4 but a negligible amount is taken by Q3 to maintain it and, hence, Q2 in conduction.

Once the input pulse has passed, the emitter current of Q2 flowing through the resistor R3 holds Q1 in cutoff to a back bias level equal to the voltage remaining on the timing capacitor C2. As long as there is any charge remaining on C2, transistor Q2 is maintained in conduction and its emitter current through R3 generates a holdoff bias for Q1. This operation is significant because any additional new pulses must first overcome the holdoff bias of Q1 and Q1 again conducts. Hence, the circuit provides a measure of noise immunity.

As far as C2 is concerned, any additional new pulses reset the acquired charge level to the fixed peak charge level from the existing charge level rather than from the zero charge level. This feature is illustrated in the second line of FIG. 3 for various pulse recurrence times as hereinabove discussed. Because the acquired charge at the emitters of Q1 and Q2 does not first fall to zero for pulses falling within the discharge rundown time of C2, when the circuit is triggered with a "-first" pulse the output state remains uninterrupted for all subsequent pulses occurring within that portion of the RC rundown ramp time existing above the threshold-sensing level turnoff point (predetermined level). This manner of operation is indicated on line 2 of FIG. 3. A DC level sensitive threshold detector (output pulse generator 15) connected to the junction of Q1 and Q2 is actuated by the first pulse and maintains its low state without interruption until the voltage at the emitters of Q1 and Q2 drops below a predetermined level. Transistors Q6, Q7 and tunnel diode TD which form the output pulse generator perform the level sensitive threshold detector function.

The acquired charge level variations at the emitters of Q1 and Q2 are picked off and fed through a low value isolating resistor R15 to the voltage divider combination consisting of R12 and R13. The decoupled voltage at the base of Q7 essentially sets the reference switching point. The resistance values are so weighed so that the voltage levels at the base of Q6 and at the base of Q7 favor a stable nonconducting state for Q6 and a conducting state for Q7 when the circuit is in the quiescent condition i.e., only the reference voltage level is present at the base of Q6. On receipt of the acquired charge variations from the emitters of Q1 and Q2, Q6 is switched on and Q7 is switched off. The increase in the collector current of Q6 causes TD to be switched from a low impedance "off" state to a high impedance "on" state and a fast rise time pulse appears at output terminal 19. Transistor Q6 and TD remain in this state for the duration of the time the acquired charge at the junction of the emitters of Q1 and Q2 remain above the threshold or predetermined level.

To achieve the same output pulse termination time for each input pulse regardless of variations in trigger repetition rate it is necessary to maintain a constant voltage level at the base of Q7 across R13. As illustrated on the lefthand side of FIG. 3, for high repetition rates the acquired charge level may not reach the referenced level for extended periods, and, were if not for the presence of compensation at the base of Q7, the average charge buildup on C2 would fall changing the trigger reference level. The compensation is provided by connecting the base of Q7 to the collector of Q5 through D5 and R11. Because the pulse appearing at the collector of Q5 is negative as illustrated in the third line of FIG. 3 and follows the acquired charge rundown time duration, sufficient addition of current is supplied to C3 if R11 is selected to compensate for the reduced charging effect of high input pulses repetition rates. Diode D5 prevents any feedback from C3 at low repetition rates.

Temperature compensation for the base-emitter junction offset voltage variation of Q1 is provided by the diode network consisting of D1, D2, and D3. This compensation insures that the reference level is temperature stable. If desired, additional temperature stability of the output pulse width may be achieved by sharing the total resistance of R13 with a sensistor.

The timing capacitor C2 can take on various values depending upon the required output pulse width, input pulse amplitude and width into C1 and the ramp discharge current through Q4. The ramp discharge current through Q4 must be great enough to maintain Q4 in conduction at low temperatures and also be several orders of magnitude above leakage currents from C2. Preferably, the capacitance value C2 coupled with the resistance of the discharge path creates an RC product about one-half the time duration of the input pulse into C1 so that C2 can charge to the peak amplitude; lacking this, the constant amplitude input pulse into C1 must embody a constant width to insure that the timing capacitor C2 receives a constant charge for each received pulse.

It will be appreciated from the foregoing description that the circuit illustrated in FIG. 2 provides a monostable, pulse generator network that can operate in the nanosecond range. It will also be appreciated that the circuit consumes a small amount of power, for example, in one embodiment 20 milliwatts of power is suitable for running the circuit. In addition, the circuit illustrated in FIG. 2 can be fabricated in welded modular form on a production basis; hence, it is inexpensive.

While it is not necessary to the overall operation of the invention that a constant amplitude pulse generator be provided, a constant amplitude pulse generator is necessary when the charge rundown timing circuit is not pulsed by constant amplitude pulses. A suitable circuit for providing constant amplitude pulses is illustrated in FIG. 4.

The circuit illustrated in FIG. 4 comprises two PNP transistors designated Q8 and Q9; a tunnel diode designated TD1; an inductor designated L1; four capacitors designated C4, C5, C6 and C7; and seven resistors designated R16 through R22.

The input terminal 17 is connected through C4 to the base of Q8. The base of Q8 is connected through R16 to a voltage source designated +V and through R17 to ground. The emitter of Q8 is connected through C5 in parallel with R19 to +V and to the emitter of Q9. The collector of Q8 is connected through R18 to ground and through C6 to the base of Q9. The collector of Q9 is also connected to output terminal 21. The base of Q9 is connected through R22 in series with C7 to ground. The junction between R22 and C7 is connected through R20 to the base of Q8 and through R21 to +V.

The circuit illustrated in FIG. 4 operates in a generally well-known manner. Upon the receipt of an input pulse at the input terminal 17 the transistors Q8 and Q9 switch states. The switching of the states turns Q8 off and Q9 on. Turning Q9 on creates a pulse across TD1 which is applied to the output terminal 21. TD1 insures that the output pulse is a constant amplitude pulse and L1 determines the pulse duration.

It will be appreciated from the foregoing description that the invention provides a novel monostable pulse generator that overcomes the disadvantages of prior art resettable monostable pulse generators. Specifically, a plurality of bistable circuits and a plurality of AND/OR gates are not required. In addition, the circuit is not frequency limited as are prior art generators because a separate circuit is not required for each input pulse that occurs during a particular time duration. Further, the termination time of the output pulse as measured from the inception of the last received pulse may also be preset.

It will be appreciated by those skilled in the art and others that the invention has only described one embodiment of the invention. Other embodiments will be obvious to those skilled in the art. Also, other constant amplitude pulse generators can be used. Moreover, circuit modifications can be made without departing from the scope of the invention. Hence, the invention can be practiced otherwise than as specifically described herein.

I claim:

1. A resettable monostable pulse generator comprising:
a charge rundown-timing circuit including a timing capacitor chargeable to a peak level and dischargeable to a predetermined level and a transistor discharge path connected to said timing capacitor;
an output pulse generator connected to said charge rundown-timing circuit having one output state when the charge on the timing capacitor is between said peak level and said predetermined level and a second state when the charge on said capacitor is below said predetermined level; and
a pair of emitter couple transistors connected so as to sense the voltage level of said timing capacitor and generate an output signal, said output signal being applied to said output pulse generator.

2. A resettable monostable pulse generator as claimed in claim 1 including a constant amplitude pulse generator connected to the input of said charge rundown-timing circuit.

3. A resettable monostable generator comprising:
a charge rundown-timing circuit including a timing capacitor chargeable to a peak level and dischargeable to a predetermined level;
an output pulse generator connected to said charge rundown-timing circuit having one output state when the charge on the timing capacitor is between said peak level and said predetermined level and a second state when the charge on said capacitor is below said predetermined level, said charge rundown-timing circuit comprising:
first, second, third and fourth transistors of one polarity,
a fifth transistor of the opposite polarity,
the base of said first transistor connected so as to receive an input pulse,
the collector of said first transistor connected to the base of said fifth transistor,
emitters of said first and second transmitters connected together and to said output pulse generator,
said timing capacitor connected to the base of said third transistor,
the base of said third transistor connected to the emitter of said fifth transistor,
the emitter of said third transistor connected to the base of said second transistor and the collector of said third transistor connected to the collector of said second transistor, and
the collector of said fourth transistor connected to said timing capacitor so as to provide a discharge path for said timing capacitor.

4. A resettable monostable pulse generator as claimed in claim 3 wherein said output pulse generator includes first and second transistors, the base of said first transistor connected to the emitters of said first and second transistor of said charge rundown-timing circuit, the emitters of said first and second transistors connected together and through a resistor to a negative voltage source, and the collector of said first transistor connected to an output terminal.

5. A resettable monostable pulse generator as claimed in claim 4 wherein said charge rundown-timing circuit includes a plurality of diodes connected between the base of said first transistor and ground.

6. A resettable monostable pulse generator as claimed in claim 5 wherein said charge rundown-timing circuit includes a diode connected between the collector of said fifth transistor and said timing capacitor.

7. A resettable monostable pulse generator as claimed in claim 6 including a constant amplitude pulse generator connected to the input of said first transistor of said charge rundown-timining circuit.

8. A resettable monostable pulse generator responsive to an input pulse comprising a timing capacitor, means for charging the timing capacitor only in response to the input pulse, a constant impedance path for discharging the timing capacitor after it has been charged in response to the pulse, a difference amplifier including a pair of transistors with a common emitter connection, a first of said transistors having a base responsive to the input pulse and the second transistor having a base responsive to the charge level of the capacitor, means for back biasing the first transistor while the capacitor is discharging and for forward biasing the first transistor in response to said pulse, and means responsive to the level of voltage derived at the common connection for deriving an output signal having first and second levels, said first level being derived in response to the voltage having a value greater than a predetermined amplitude and the second level being derived in response to the voltage having a value less than the predetermined amplitude.

9. The pulse generator of claim 8 wherein the charging means includes switch means responsive to the bias state of the first transistor, said switch means being closed to charge the capacitor only while the first transistor is forward biased.

10. The pulse generator of claim 9 wherein the charging means further includes diode means connected between the switch means and the capacitor for enabling the capacitor to be charged and for preventing discharge of the capacitor through a path in parallel with the constant impedance path.

11. The generator of claim 8 wherein the biasing means includes an impedance connected to the common connection.

12. A resettable monostable pulse generator responsive to an input pulse comprising a timing capacitor, means for charging the timing capacitor in response to the input pulse, a constant impedance path for discharging the timing capacitor after it has been charged in response to the pulse, a difference amplifier having first and second input terminals and an output terminal for deriving a voltage indicative of the difference between the voltages applied to the first and second input terminals, means for applying the input pulse to one of said input terminals, means for deriving a signal indicative of the current in the constant impedance path, means for feeding said signal to said second input terminal, and means responsive to the voltage derived at the output terminal for deriving an output signal having a first level in response to the voltage at the output terminal having a value greater than a predetermined amplitude and a second level in response to the voltage at the output terminal having a value less than the predetermined amplitude.